US009092831B2

(12) United States Patent
Mansfield et al.

(10) Patent No.: US 9,092,831 B2
(45) Date of Patent: Jul. 28, 2015

(54) METHOD AND SYSTEM FOR ENERGY RECAPTURE (75) Inventors: Richard James Walter Mansfield, Cambridge, MA (US); Daniel Shani, Newton, MA (US); Nissim Shani, Newton, MA (US)

(73) Assignee: Energy Intelligence, Inc., Buffalo, NY (US)

( * ) Notice: Subject to any disclaimer, the term of this patent is extended or adjusted under 35 U.S.C. 154(b) by 0 days.

(21) Appl. No.: 13/374,499

(22) Filed: Dec. 30, 2011

(65) Prior Publication Data
US 2013/0173443 A1 Jul. 4, 2013

(51) Int. Cl.
F02B 63/04 (2006.01)
F03G 7/08 (2006.01)
H02K 7/18 (2006.01)
G06Q 50/06 (2012.01)
H02N 2/18 (2006.01)

(52) U.S. Cl.
CPC *G06Q 50/06* (2013.01); *F03G 7/08* (2013.01); *H02K 7/1853* (2013.01); *H02N 2/18* (2013.01)

(58) Field of Classification Search
USPC ............. 705/35, 36 R, 36 T, 37; 290/1 R
See application file for complete search history.

(56) References Cited

U.S. PATENT DOCUMENTS

| 4,239,975 | A | * | 12/1980 | Chiappetti | 290/1 R |
| 5,278,773 | A | | 1/1994 | Cousineau | 364/494 |
| 5,642,984 | A | | 7/1997 | Gorlov | 416/176 |
| 5,662,197 | A | | 9/1997 | Tabe | 192/64 |
| 6,012,709 | A | | 1/2000 | Meatto et al. | 267/36 |
| 6,155,892 | A | | 12/2000 | Gorlov | 440/9 |
| 6,407,484 | B1 | | 6/2002 | Oliver et al. | 310/339 |
| 7,023,160 | B2 | | 4/2006 | Virtanen et al. | 318/438 |
| 7,429,801 | B2 | | 9/2008 | Adamson et al. | 310/339 |
| 7,614,397 | B1 | | 11/2009 | Munson | 126/677 |
| 7,740,973 | B2 | | 6/2010 | Vail et al. | 429/39 |
| 2007/0280781 | A1 | * | 12/2007 | Jeong | 404/16 |
| 2009/0048051 | A1 | | 2/2009 | Koleoglu | 475/183 |
| 2009/0195124 | A1 | * | 8/2009 | Abramovich et al. | 310/339 |
| 2010/0114397 | A1 | | 5/2010 | Cardinal et al. | 70/297 |

OTHER PUBLICATIONS

U.S. Appl. No. 09/828,500, Mar. 2002, Pionzio et al.
U.S. Appl. No. 12/582,353, Jun. 2010, Walling et al.
U.S. Appl. No. 12/878,628, Sep. 2010, Prax and Waldrop.
U.S. Appl. No. 12/886,039, Sep. 2010, Slocum et al.

* cited by examiner

*Primary Examiner* — Greg Pollock
(74) *Attorney, Agent, or Firm* — William A. M. Mansfield (57) ABSTRACT Certain embodiments of the invention may include apparatus, systems and methods for efficient implementation of energy-recapture farms for conditioning electrical power from energy-recapture sources of vehicular mechanical energy, which would otherwise be dissipated, as exemplified by farms for energy-recapture that provide available electrical energy for commercial distribution. Said farms may include one or more energy-recapture sources. One method for aggregation may include a plurality of mechanical energy-recapture devices comprising individual source energy output of one or more energy-recapture sources, measuring conditions of one or more energy-recapture sources via a controller that facilitates communication with one or more energy-recapture sources, and managing the distribution of the conditioned electrical energy to the national electrical grid.

16 Claims, 6 Drawing Sheets

Embodiment of the Power Generating Circuit

FIG. 1. Embodiment of the Power Generating Circuit

FIG. 2. Embodiment of Mechanical Energy Transducer: Side View

FIG. 3. Oblique View of Mechanical Energy Cumulator

FIG. 4. Embodiment of Mechanical Energy Recapture System: Top View

FIG. 5. Embodiment of Plurality of Energy Recapture Modules Comprising a Power Generating Energy Recapture Control Farm FIG. 6 Computer Block Diagram of Auction System for Energy Recapture Control Farm

METHOD AND SYSTEM FOR ENERGY RECAPTURE

CROSS-REFERENCE TO RELATED APPLICATIONS

This application is related to co-pending U.S. patent application Ser. No. 13/135,493, filed Jul. 7, 2011 and entitled "Method and System for Energy Harvesting."

This application is related to co-pending U.S. patent application Ser. No. 13/136,764, filed Aug. 10, 2011 and entitled "Method and System for Control of Energy Harvesting Farms"

TECHNICAL FIELD

The present invention relates generally to recapturable energy harvesting, more particularly, to systems and methods for efficient and effective energy recapture from dynamically moving mechanical sources and the commercial redistribution of said recaptured energy as electricity.

BACKGROUND

Energy conservation and climate change mitigation have fostered the development of alternatives to the direct use of fossil fuels. Light to electrical energy conversion in the form of solar panels is one alternative. Electrical energy generated by conventional wind turbines is another alternative. In both of these cases, a large area often in a remote geographical location is required so that many solar panels or wind turbines can be assembled into farms to provide significant generation from renewable resources. Among other challenges, the remote location results in power transfer loss when connecting to the National Power Grid.

An alternative [see U.S. patent application Ser. No. 13/135,493] that takes advantage of existing real estate to generate power close to potential usage sites and users on the National Power Grid is the harvesting of otherwise dissipated energy from the movement of vehicular traffic.

Just as farms of solar panels and of wind turbines require control systems (addressed in previous patents listed), so do farms of modules engaged in energy harvesting from vehicular traffic given the following special characteristics:

1. Mechanical energy conversion modules are subject to abrasion
2. Modules are exposed in a public space to road traffic and weather hazards rather than confined in fully secured areas
3. Modules not in a protected area so are exposed at night in isolation to human and animal vandalism
4. Modules operation and maintenance must minimize traffic interruptions
5. Module operation must continually maintain and assist vehicular safety Having noted the common challenges, a need will likely arise for a central system to engineer the energy recapture modules for power-generating efficiency, long-term reliability and sustainable power generation. For example, a utility may monitor the grid power demand and may need to communicate with the energy-recapture farm to determine if the farm has the capacity to meet some or all of the power demand. As the number of energy-recapture modules increases it is important that the collection of inverters appears to the grid as if it was the same as for other power plants. As an energy-recapture farm can include many mechanical-to-electrical energy conversion modules with power inverters there is a need for a centralized control to collectively manage the inverters along with all of the supporting energy farm data as one cohesive system. Such a control system must take into account that the Energy Recapture Modules are in relatively close proximity for a given installation and vehicular traffic flow varies over a 24-hour period. As more energy farms become operational, the communication, coordination, and control among the plurality of farms becomes more and more critical. However, coordination also becomes more difficult when the multiple energy farms (with their multiple associated controllers) are tied together in ad-hoc systems. Therefore, a need exists for systems and methods for controlling power in recapturable energy sources and a means of commercially distributing such power.

An alternative [see U.S. patent application Ser. No. 13/136,764] describes the application of advanced technologies to the control of power generated by otherwise dissipated energy from the movement of vehicular traffic.

An energy recapture module for recapturing energy from vehicular traffic and converting it into electrical power and its associated farm control system for conditioning the electrical power for entry into the National Power Grid is faced with challenges for efficient manufacture, for long term sustainability and for optimal distribution to meet energy needs.

ADVANTAGES

The present invention comprises embedded apparatus with systems and methods for incorporating reliable, sustainable power recapture components for coordinating and generating electrical energy from mechanical energy, which would otherwise be dissipated, into available electrical energy and commercially distributing said recaptured electrical energy. Said invention teaches an innovative and comprehensive approach to implementation of modules for energy recapture from vehicular motion.

SUMMARY OF THE INVENTION

Some or all of the above needs may be addressed by certain embodiments of the invention. Certain embodiments of the invention may include systems and methods for assembling energy recapture modules, for instance, integrated real-time power and energy recapture across modules with N+1 redundancy for optimizing reliability. The present invention overcomes the limitations of conventional approaches by providing a power-recapture method for energy that would otherwise be dissipated; and by deploying the system in close proximity to energy consuming users and devices. Aspects and advantages of the invention will be set forth in part in the following description, or may be obvious from the description, or may be learned through practice of the invention.

Variations and modifications can be made to these exemplary embodiments of the present disclosure. Other embodiments and aspects of the invention are described in detail herein and are considered a part of the claimed invention. Such other embodiments and aspects can be understood with reference to the following detailed description, accompanying drawings, and claims.

BRIEF DESCRIPTION OF THE FIGURES

A full and enabling disclosure of the present invention, including the best mode thereof, directed to one of ordinary skill in the art, is set forth in the specification, which makes reference to the appended figures, which are not necessarily drawn to scale, and wherein.

DETAILED DESCRIPTION OF THE PREFERRED EMBODIMENT

Reference now will be made in detail to embodiments of the invention, one or more examples of which are illustrated more fully in the drawings. Each example is provided by way of explanation of the invention, not limitation of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. In fact, it will be apparent to those skilled in the art that various modifications and variations can be made in the present invention without departing from the scope or spirit of the invention. For instance, features illustrated or described as part of one embodiment can be used with another embodiment and such variations come within the scope of the appended claims and their equivalents.

Like numbers refer to like elements throughout. The term "exemplary" as used throughout this document is defined to mean "example." It will be appreciated that terms such as "left", "right", "top", "bottom", "inwardly", "outwardly", "front", "inner", "up", and "down" and other positional descriptive terms used herein below are used merely for ease of description and refer to the orientation of the components as shown in the Figures. It should be understood that any orientation of the elements described herein is within the scope of the present invention.

The present invention overcomes the limitations of conventional approaches by providing a reliable, sustainable, power-recapture apparatus, system and method for capturing energy would otherwise be dissipated; and by deploying the system in close proximity to energy consuming users and devices.

Certain embodiments of the invention may enable efficient, effective transfer of mechanical energy to electrical generators for producing power in energy-recapture farms with N+1 reliability. According to certain exemplary embodiments of the invention, mechanical energy will be stored and maintained in rotational inertial state that may be utilized to facilitate increased interoperability and control within energy-recapture farms. Other embodiments of energy recapture may be utilized to facilitate increased interoperability and control among multiple energy-recapture farms.

Various components, modules, interfaces, communication links, and sensors for controlling power in energy recapture farms, according to embodiments of the invention, will now be described with reference to the accompanying figures.

The Energy Recapture Core System comprises six interconnected functional components:

1. Mechanical Energy Capture Device for transforming linear mechanical motion of heavy vehicles into mechanical, rotational force.
2. Electric Generator for generating alternating current from mechanical rotational force.
3. Piezoelectric plate for sensing approaching objects and generating electrical power for the electromagnets in the Electric Generator to maximize efficiency at high rates of rotation. Secondarily the power will be stored in the battery noted below, or supplied immediately to the National Power Grid.
4. A Controller with rectifiers to convert the output of the one or more Electric Generators and Piezoelectric Plates to direct current for storage or for transmission, with suitable phase and voltage control, to the National Power Grid; and for supplying current to the electromagnets of one or more Electric Generators
5. A Storage Battery to retain the energies generated by one or more Electric Generators and by one or more Piezoelectric Plates.
6. A Computer to coordinate and monitor the power generation for maximum efficiency. The computer can be wirelessly connected to the internet for remote monitoring, control and management of commercial distribution of the electrical power generated It will be appreciated that these functional components may be combined to serve the same functional purposes, for example, the Computer for monitoring and coordination and the Controller may be combined to serve the functions of monitoring, coordination and power conditioning. It should be understood that any such combination of the functional components described herein is within the scope of the present invention.

Figure 1:
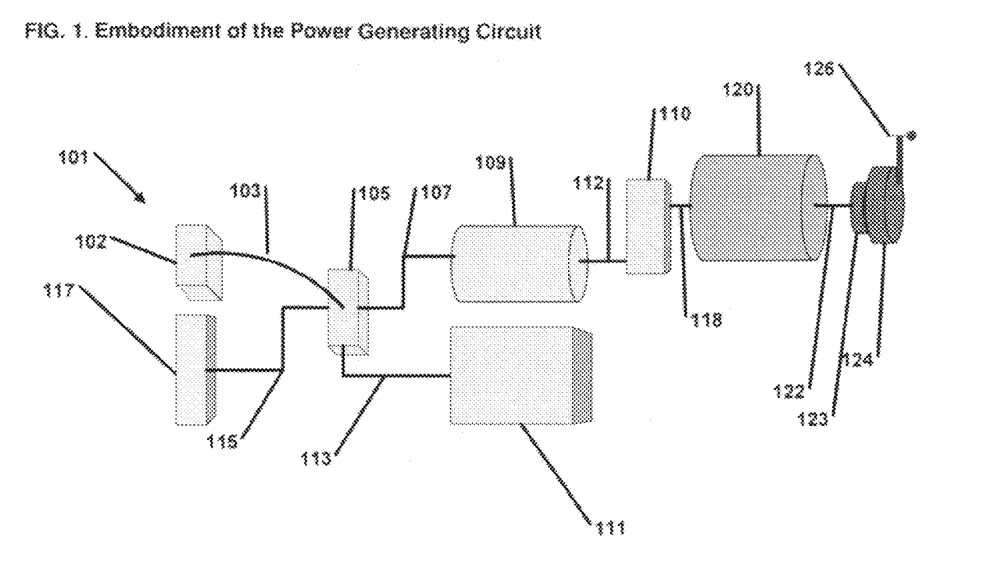
FIG. 1. Embodiment of the Power Generating Circuit

As shown in FIG. 1 the Energy Recapture System 101 provides for a cylindrical Electric Generator 109 positioned adjacent to a piezoelectric plate 111 both in electrical communication 107, 113 with a circuit controller 105. A remotely communicating Computer 102 is in electrical communication with the circuit controller 105 via 103 for monitoring and supervision. The system is positioned such that vehicles first pass over the region of the Piezoelectric Plate 111 before passing over the slightly raised Activation Plate that is directly coupled by a mechanical lever 126 to the circular Rotary Disk 124 that is directly coupled through a Unidirectional Clutch 123 by a mechanical linkage 122 to the Mechanical Energy Cumulator, a cylindrical flywheel 120. The Mechanical Energy Cumulator directly urges through a mechanical linkage 118 the input first gear in the VM Gearbox, a two-gear speedup gearbox 110. The output second gear by means of a mechanical linkage 112 urges the rotor of the Electric Generator 109. The Piezoelectric Plate 111 is positioned to receive compression strain as a wheeled vehicle advances over the surface below which the plate is mounted. The electrical signal thus generated serves to activate the electromagnets of the Electric Generator 109 as a wheeled vehicle passes over the load bearing Activation Plate of the Mechanical Energy Capture Device thus urging the Activation Lever 126 to turn the Rotary Disk 124. The controller 105 uses the sensing signal from the piezoelectric plate 111 to adjust via 107 the current flowing in the electromagnets of the said Electric Generator 109 to maximize the conversion of rotational mechanical energy captured by the Mechanical Energy Recapture Device 120-126. Said captured rotational mechanical energy is then imparted via the gearbox 110 to the rotor of the Electric Generator to generate electrical energy that is conveyed via 107 and 115 to the storage battery 117 or with appropriate phase conversion and voltage amplification transmitted directly to the National Power Grid.

Figure 2:
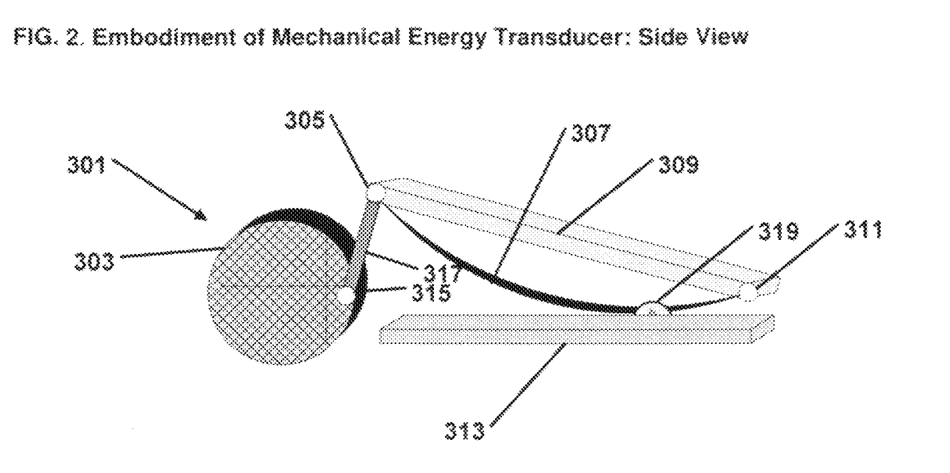
FIG. 2. Embodiment of Mechanical Energy Transducer: Side View

As shown in FIG. 2, the Mechanical Energy Recapture Device 301 comprises a counter-sunk Activation Plate 309 that in depressed mode is level with the road resting on a shelf 313; a hinge 311 on the underside of the Activation Plate on the traffic-facing edge; a plurality of affixed Hybrid Leaf Springs 307 that elevate the Activation Plate about the hinge in the direction of traffic flow; one or more vertical levers 317 affixed about a bearing 315 along the elevated edge of the Activation Plate that connects to one or more Rotary Disks 303 below the level of the road surface. The elevated edge of the Activation Plate 305 of the Mechanical Energy Recapture Device would be forced down to road level with each passage by a set of vehicular wheels. Since the next passage at vehicular highway speeds would occur within 100 msec., the Activation Plate would have to be restored to its resting position very quickly. So the recovery mechanism must be both fast and reliable over millions of cycles. A composite material leaf spring composed for example of alternating steel plates and carbon fiber would have sufficient elasticity to restore the Activation Plate quickly and yet be resilient over millions of cycles. In such a Hybrid Leaf Spring 307 the primary leaf element with sufficient modulus of elasticity has bonded to the tension surface one or more parallel layers of composite material; similarly, the compression surface of the primary leaf has one or more parallel layers of composite material. The ends of the primary leaf are mounted asymmetrically to the moveable Activation Plate 309 around a fixed mounting rod 319 perpendicular to the direction of the Hybrid Leaf Spring 307. The Activating Plate urged by the moving vehicle constitutes a third class lever but other force-transmitting lever arrangements can be considered. In an alternate embodiment two such Mechanical Energy Recapture Devices 301 could be positioned sequentially but facing in opposite directions thus eliminating any gap above the road level and providing two power strokes from a single vehicular wheel passage. In another alternate embodiment the Activation Plate itself could be contoured in a convex arc of the appropriately strong yet elastic material secured at both edges such that the power stroke is driven from the center of the arc. The latter embodiment would also eliminate any gap above the road level. In another alternate embodiment the downward Power Stroke of the Activation Plate would be mechanically linked so as to rotate the Rotary Disk more than 180-degrees so that the Recovery Stroke would also drive the Rotary Disk in the same direction much like the power stroke of a locomotive engine to its wheels. In that way the Recovery Stroke would continue to turn the Rotary Disk in the same direction as the Power Stroke did using the potential energy stored in the Hybrid Leaf Springs. Similarly, in another embodiment the Power Stroke would subject a coiled-spring mechanism to sufficient tension or subject a pneumatic compression cylinder to sufficient pressure that the Recovery Stroke would continue to drive the Rotary Disk. The practicality of these latter two embodiments would depend on the speed required of the Recovery Stroke to position the Activation Plate back in its resting position for the passage of the next set of vehicular tires to fully drive the Power Stroke.

Figure 3:
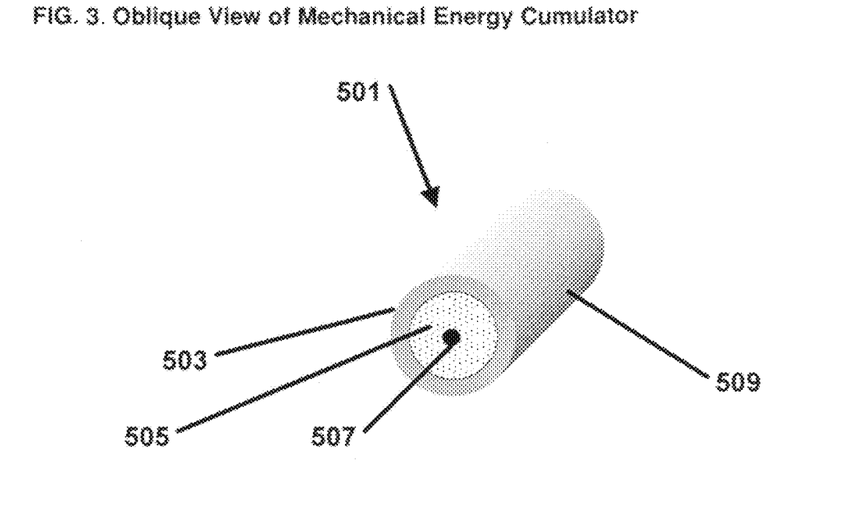
FIG. 3. Oblique View of Mechanical Energy Cumulator

As shown in FIG. 3, Mechanical Energy Cumulating Device 501, such as s flywheel, comprising an inner axial rod 507 supported by fluid-filled, heavy-duty bearings, a middle zone of honeycombed metal for low density, high structural integrity 505 an outer zone of dense material 503 with a smooth polished, corrosion resistant surface 509 for optimal inertial energy storage. The resulting cylinder efficiently and effectively acquires and retains rotary inertial torque for driving the Electrical Generators.

Figure 4:
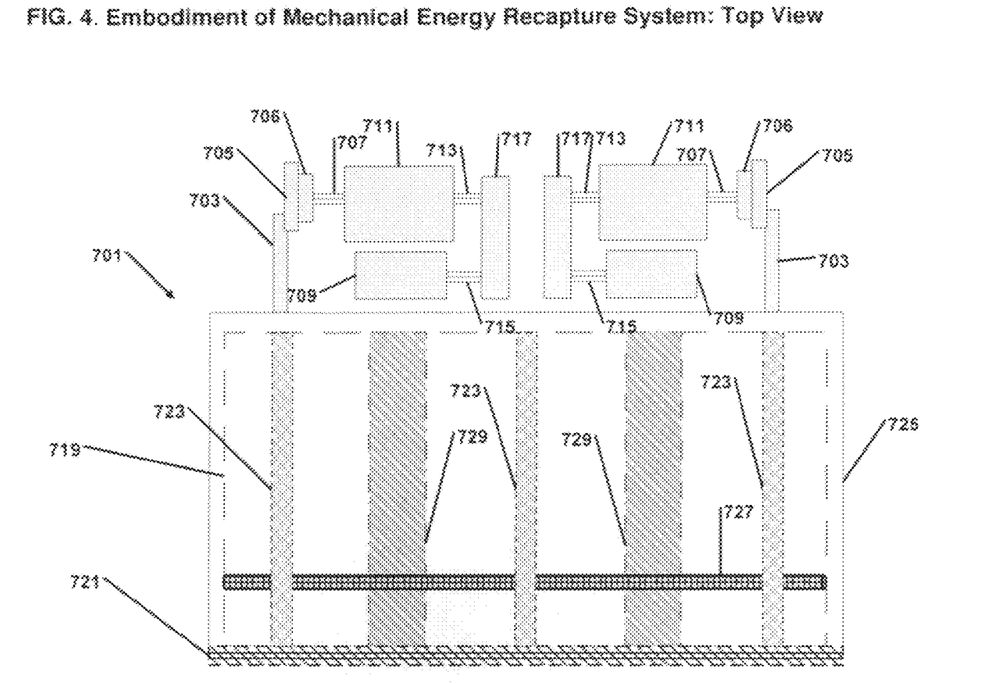
FIG. 4. Embodiment of Mechanical Energy Recapture System: Top View

The Preferred Embodiment of the full Mechanical Energy Recapture System is shown in FIG. 4. The Activation Plate 725 will be subjected to vertical forces produced by the mass of vehicles, such as 4000-lb automobiles, passing over the plate in the direction of traffic flow. A rigid metallic plate, such as that formed of steel, would be capable of withstanding such forces but would be subject to corrosion over time. Moreover, such a plate would generate vibration some of which would be in the audible range causing noise pollution or safety concerns. Accordingly, a composite material, such as para-aramid synthetic fiber, e.g., Kevlar® would provide light-weight strength and would not be subject to corrosion or generate noise pollution. When compressed by the weight of a vehicle the plate would pivot into a recessed holder 719 lined with cushioning material such as silicone gel that would absorb any sound. The Activation Plate's descent is supported by a heavy duty interior hinge 721. As a result of these arrangements the vehicular driver and passengers would experience a ride over the Activation Plate that is both smooth and quiet.

To convert the vertical descending motion of the Activation Plate by a force-transmitting lever to the rotary motion of the Rotary Disk 705 in a reliable manner for millions of cycles is a problem with a well-established conventional solution, e.g., as implemented in steam locomotives. However, in the present invention the strokes are periodic but not continuous so a one-way or over-running Unidirectional Clutch 706 provides a means of accumulating the rotational torque energy in a step-like manner. Such a reliable clutch would employ well-established technology whereby an internal rotary member engages a coaxial external rotary member only when the internal rotator member turns in a single drive direction, e.g., clockwise.

The center shaft 707 of the Rotary Disk urges the rotation of a flywheel or Mechanical Energy Cumulator 711 as specified in FIG. 3. By means of the Unidirectional Clutch 706 the corresponding drive shaft 713 of the Mechanical Energy Cumulator 711 connects to a velocity-multiplying gearbox 717 the VM Gearbox. The rotating shaft output of the VM Gearbox 715 is then used to rotate the drive shaft of an electric generator, the Dynamic Electrical Generator 709 configured to optimize output over a range of speeds as described previously (see U.S. patent application Ser. No. 13/135,493).

Although the preferred embodiment is described, alternate embodiments of the invention are possible so that the final production deployment will depend on value engineering. For example, in an alternate embodiment the Activation Plate could extend below the surface and the hinge could be replaced by a pivot axle so that upward movement of the subsurface portion of the Activation Plate could serve via another mechanical linkage to drive the rotation of the Rotary Disk in a second class force-transmitting lever arrangement. As another example, the VM Gearbox may be simplified by using a belt drive to achieve increased speed at the cost of increased startup torque and potential premature failure of the drive belt. Moreover, the VM Gearbox and the Mechanical Energy Cumulator may be applied in a difference sequence so that the rotational rate is increased before driving the flywheel rather than subsequently. More than one Dynamic Electrical Generator could be driven from a single activation sequence. Thus, the output drive shaft of a single VM Gearbox could drive more than one Dynamic Electrical Generator for redundancy and reliability. Moreover, in place of the Composite Leaf Springs, a plurality of heavy duty coil springs, or a plurality of pneumatic springs could be used.

FIG. 4 shows a top view of the support framework of the Mechanical Energy Recapture System 701 in an Energy Recapture Module. The Activation Plate 725 is supported by an inlaid shelf 719 and affixed to a hinge 721. The Activation Plate is maintained in an elevated state by a plurality of supportive Hybrid Leaf Springs 723. The Hybrid Leaf Springs are anchored at the top and bottom of the Activation Plate and pivot about a fixed Pivot Axle Bar 727 that is supported at each end of the Activation Plate and at a plurality of positions by vertical support beams 729.

Consider, for example, in the preferred embodiment of the present invention, the downward stroke of the Activation Plate after engagement by the forward moving vehicle tire in approximately 5 msec. producing a torque by means of the mechanical linked lever 703 generating at least one-third rotation of the Rotary Disk 705, which is equivalent to an impulse rate of 60 RPM that is conveyed through the Unidirectional Clutch 706 to the Mechanical Energy Cumulator Device 711 a flywheel cylinder. With heavy traffic flow the Mechanical Energy Cumulator Device would accelerate to a comparable rotational velocity, i.e., approximately 60 RPM.

The speed in RPM (N) requires for an electric generator with P poles to produce electricity of frequency, f, is given by $$N=(120\times f)/P \qquad \text{[Equation 1.1]}$$

To drive the multi-pole generator of, for example, 4 poles, the Dynamic Electrical Generator 709 must rotate at 1800 RPM to produce a 60-Hz electric current. In order to convert the 60 RPM of the Mechanical Energy Cumulator Device to the required 1800 RPM of the Dynamic Electrical Generator, a simple transmission two-stage gearbox, the VM Gearbox 717 is interposed; however, the Dynamic Electrical Generator can operate efficiently over a range of speeds.

The VM Gearbox produces a speed-up ratio of 30:1 in two stages: 5:1 followed by 6:1. For coplanar meshing bearings the contact surface is a line. To reduce contact stress roller bearings are employed and in the preferred embodiment hexagonal roller bearings, which distribute the contact stress at the expense of a small amount of linear sliding friction are employed. The gears are composed of high strength steel alloy in a sealed lubricant chamber or composed of ceramics without the lubricant.

With an average car weight of 4000 lbs, each pair of wheels traversing the Activation Plate, which is assumed to be elevated by a small amount, e.g., one inch above its depressed position measured at its trailing edge, generates a force given by:

$$F=2000\times 0.0825=165 \text{ foot-pounds} \qquad \text{[Equation 1.2]}$$

For 3000 cars passing a given point in an hour this amounts to 990,000 foot-pounds, which is equivalent to 22.4 KWH.

When deployed for energy recapture from moving vehicles, the Activating Plate covers a full highway lane. As shown in FIG. 4, a plurality of Mechanical Energy Recapture Devices can be aligned adjacent to that Activation Plate. Similarly, a plurality of rows of Mechanical Energy Recapture Devices can be aligned sequentially. Such an assembly would be mounted in a single Energy Recapture Module with the appropriate storage, communication and control apparatus as outlined in FIG. 1.

Figure 5:
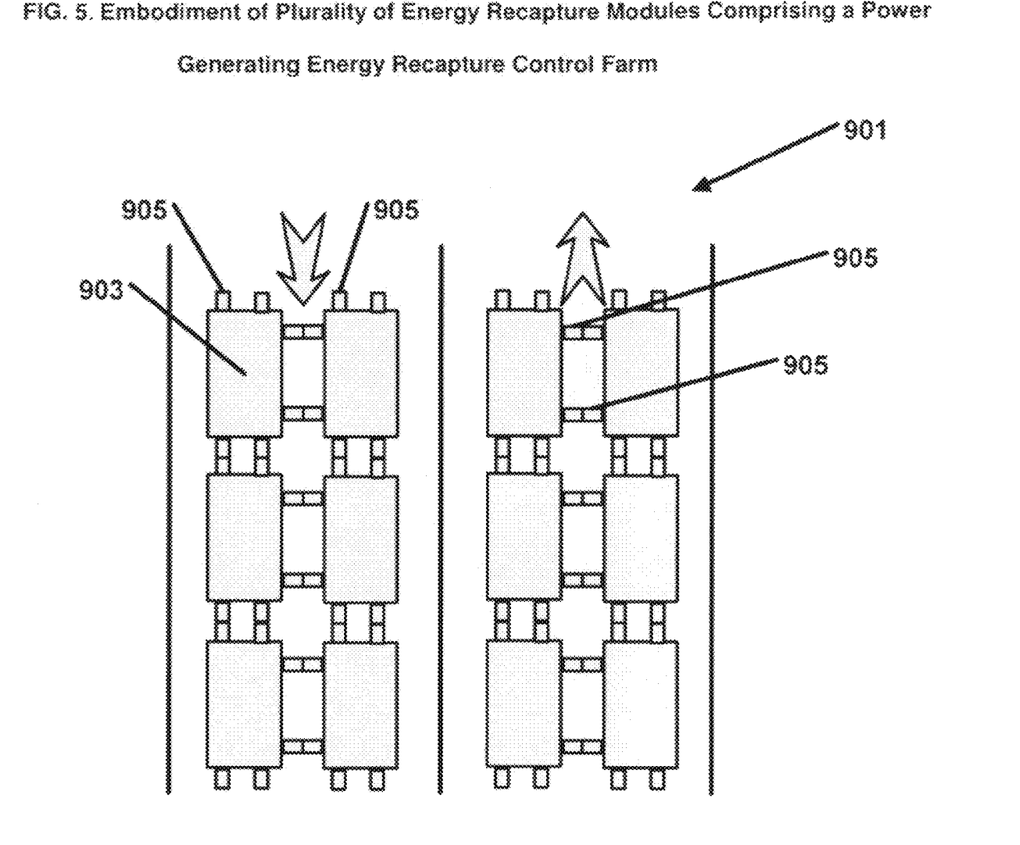
FIG. 5. Embodiment of Plurality of Energy Recapture Modules Comprising a Power Generating Energy Recapture Control Farm FIG. 6 Computer Block Diagram of Auction System for Energy Recapture Control Farm

In certain embodiments of the invention, an Energy Farm Control System would comprise a plurality of Energy Recapture Modules each joined by connectors to neighboring Energy Recapture Modules over which one may be transmitted power and communicate control instructions and communicate information by any number of software applications that are executed to facilitate any of the operations of the Energy Recapture System. FIG. 5 shows how such Energy Recapture Modules would align and interconnect in a section of a four-lane highway as parts of an Energy Recapture Control Farm 901. Each Energy Recapture Module 903 would insert Leggo-like to its adjoining neighbor Energy Recapture Modules by means of cyber-electro-mechanical connectors 905 that provide mechanical linkage, electrical control of the Energy Recapture Devices and Energy Storage, and information such as communication as to status of the Energy Recapture Devices for optimum performance. A farm of Energy Recapture Modules is made more robust by having N+1 redundancy of networking paths for communication, control and power transmittal The output of the Energy Farm Control System would be conditioned electrical power that is sent through an Inverter to a transformer. The optimized trade-off between copper-based reactance (communication lines) and iron-based reactance (transformers) reduces the losses in the power generated as the power generated increases and decreases over time. A Transformer Substation provides conditioned power of the appropriate voltage and phase to the National Power Grid. For extended reliability the computers can be solid state devices without moving parts using solid state disks and circuitry embedded in epoxy.

Figure 6:
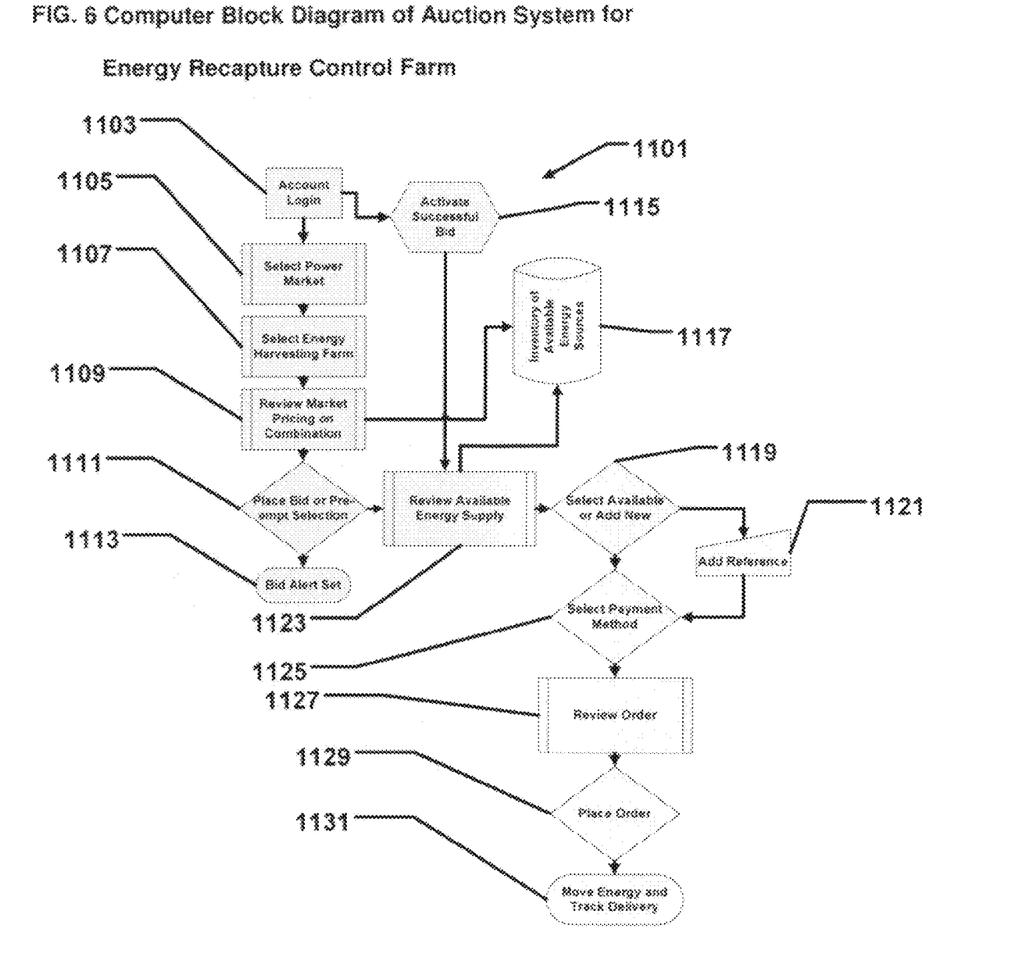

With only four (4) Energy Recapture Devices placed in a ten (10) foot long Energy Recapture Module, then in a one (1) mile single-lane stretch we would generate 22.4×528×4=47.2 MWH. Assuming each Device achieves 85% efficiency in converting mechanical energy into electricity out, this gives approximately 40 MW per hour at peak traffic flow per lane. If there are effectively 10 heavy traffic hours per day, this conservatively amounts to 400 MWH of electricity per lane per mile available to the Grid. With a four (4) lane highway the rated electrical energy output amounts to 1.6 GWH per mile per day or a potential 584.4 GWH on an annual basis For efficient and effective commercial delivery of the electrical power generated by the Energy Recapture Control Farm, an auction system 1101 is deployed as illustrated in FIG. 6, which represents a machine-based system or method of auctioning Prospective power distributors would log onto the auction website to review and select desired the target geolocation, delivery timing, and quantity. The computer system hosting the auction-based energy market would function in the following manner.

Interested bidders would have access via the website to review available energy packages, i.e., defined as amounts available within a specified period. A computer-based transactional database of energy packets would inform the bidder of time left on each auction and of the current highest bid on each auction or of the reserve bid if there were no previous bids. The location database supports an interactive graphical user interface showing distribution points searchable by specific geolocations or by addresses and by click-select from a map showing all the distribution points in a given metropolitan area or state electrical grid using maps and satellite technology, e.g., Google maps and the US Global Positioning System (GPS). The bidders would select proposed energy packages from those in the database or propose new combinations in electronic form. If the prospective power distributor was the highest bidder in at least one auction the energy package would be transmitted for the contracted period at the contracted rate; however, the prospective power distributor for a premium could preempt the auction to ensure it would secure its desired energy package and time periods.

Said network comprises a login step 1103 for securing access to the auction website using a communication protocol such as SSL with two-factor authentication with digital tokens. After authentication the prospective energy distributor or its agent would specify a desired energy package 1105 and a desired location or location(s) 1107 to review. Then the web-based interface would allow the prospective energy distributor to review available auctions that fit given parameters such as location, amount, date range, and price 1109. After a review the prospective energy distributor would make a selection 1111 and chose to purchase, an energy package for a given time and location or to bid in an auction or several auctions. A bid alert 1113 is set up in the database of the auction website. At this point if a bidder has entered a preemptive bid or subsequently won an auction a successful bid electronic message 1115 is sent to the bidder in question. The database of available energy packages is represented by 1117. Available energy packages 1123 are reviewed to determine if the desired energy package is within the available ones: if it is it is selected or if it is new it is added to the database 1119. At this point in the system or method the new file is attached 1121, then the payment method is selected 1125, subsequently the order is reviewed by the user 1127, finally an order is placed 1129, and finally the deployment system is alerted 1131. In addition, the auction server would be connected to the fee processing server which would send a portion of the winning bid to a bank server of the owner of the Energy Recapture Control Farms and send the remainder to the owner(s) of the grid over which the electrical package was transmitted as well as to any governmental entity for taxation or fees, e.g., a municipality's and/or state's and/or federal government's server, which would send it on to the entity's bank server.

As desired, embodiments of the invention may include the Energy Recapture Farm Control System with more or fewer of the auction components illustrated.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. While the invention has been described by reference to certain preferred embodiments, it should be understood that these embodiments are within the spirit and scope of the inventive concepts described. This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Although specific terms are employed herein, they are used in a generic and descriptive sense only and not for purposes of limitation. Accordingly, it is intended that the invention not be limited by the embodiments, but that it have the full scope permitted by the language of the following claims.

We claim:

1. An apparatus that extracts and controls recapturable energy from vehicular traffic, the apparatus comprising:
   a plurality of energy recapture modules interconnected in a manner providing at least N+I mechanical redundancy and at least N+I electrical redundancy with each module containing at least one energy recapture source where each energy recapture module comprises;
   at least one mechanical energy recapture device that transforms linear motion into rotational motion by means of a third-class lever mechanically urging a unidirectional clutch;
   at least one flywheel mechanically linked to and urged by the unidirectional clutch which retains rotational energy;
   at least one electromagnetic generator device mechanically linked to and urged by the rotational torque of the said flywheel through use of at least one speedup gearbox;
   at least one primary piezoelectric plate placed in the line of vehicular traffic that is activated by the said vehicular traffic in advance of activation of the said mechanical energy recapture device where the activation of the said primary piezoelectric plate serves as a signal that activates rotor and stator electromagnetic fields of the said electromagnetic generator device;
   a storage device that stores electrical energy;

a real-time integrated controller connecting the said electromagnetic generator, the said primary piezoelectric source plate, and the said storage device that stores electrical energy and conditioning the said electrical energy for commercial power generation where the real-time integrated controller activates the rotor and stator electromagnetic fields of the said electromagnetic generator;

at least one internet-accessible computer connected to, monitoring, and managing the said real-time integrated controller for commercial distribution of the said electrical energy where at least one of the said real-time integrated controllers communicates with, transmits control signals to, and receives monitoring signals from one or more of the said recapturable energy sources and is controlled by one or more of the remote said internet-accessible monitoring and control computers.

2. The mechanical energy recapture device of claim 1 comprising: at least one force-transmitting lever, one or more rotary disks urged by the said force-transmitting lever, a spring mechanism restoring the said force-transmitting lever to its predetermined rest position, at least one unidirectional clutch providing torque from the said rotary disks to one or more of the said rotary fly wheels.

3. The spring mechanism of claim 2 affixed to the said force-transmitting lever consisting of alternating steel plates and carbon fiber that form a composite hybrid leaf spring.

4. The flywheel of claim 1 further comprising: a fluid-bearing supported axle, a honey-comb structural support core, an outer solid shield with a corrosion-resistant, polished surface.

5. The electromagnetic generator device of claim 1 further comprising: the said electromagnetic generator delivering electrical power over a variable range of rotational speeds; connecting to the said real-time integrated controller optimizing the said electromagnetic generator output over a range of rotational speeds based at least in part on monitored synchronicity.

6. The real-time integrated controller of claim 1 further comprising: control instructions that communicate with one or more recapturable energy sources; and control instructions that communicate with one or more of the said primary sensing piezoelectric sources.

7. The storage device for electrical energy of claim 1 comprising an array of lithium storage batteries.

8. The internet-accessible computer of claim 1 further comprising: software applications that measure aggregate energy output from one or more energy sources; software applications that measure individual source energy output from one or more energy sources; software applications that control energy production from the one or more recapturable energy sources based at least in part on the measured aggregate energy output and the measured individual source energy output.

9. A system for an energy recapture and energy distribution farm comprising a plurality of submodules that convert mechanical energy into electrical energy each submodule further comprising:

a plurality of energy recapture modules interconnected in a manner providing at least N+I mechanical redundancy and at least N+I electrical redundancy with each module containing at least one energy recapture source where each energy recapture module comprises;

at least one mechanical energy recapture device that transforms linear motion into rotational motion by means of a third-class lever mechanically urging a unidirectional clutch;

at least one flywheel mechanically linked to and urged by the unidirectional clutch which retains rotational energy;

at least one electromagnetic generator device mechanically linked to and urged by the rotational torque of the said flywheel through use of a at least one speedup gearbox;

at least one primary piezoelectric plate placed in the line of vehicular traffic that is activated by the said vehicular traffic in advance of activation of the said mechanical energy recapture device where the activation of the said primary piezoelectric plate serves as a signal that activates rotor and stator electromagnetic fields of the said electromagnetic generator device;

a storage device that stores electrical energy;

a real-time integrated controller connecting the said electromagnetic generator, the said primary piezoelectric source plate, and the said storage device that stores electrical energy and conditioning the said electrical energy for commercial power generation where the real-time integrated controller activates the rotor and stator electromagnetic fields of the said electromagnetic generator;

at least one internet-accessible computer connected to, monitoring, and managing the said real-time integrated controller for commercial distribution of the said electrical energy where at least one of the said real-time integrated controllers communicates with, transmits control signals to, and receives monitoring signals from one or more of the said recapturable energy sources and is controlled by one or more of the remote said internet-accessible monitoring and control computers.

10. The system of claim 9 in which at least one secondary piezoelectric source charges the said storage battery.

11. The system of claim 9 in which the excess electrical energy produced by the said electromagnetic generator is supplied to the electrical national power grid.

12. The system of claim 9 in which the said modules are embedded in a transportation roadway that harvest gravitational energy from vehicles passing over the said submodules.

13. The system of claim 9 in which the said electromagnetic generator is mounted above the said secondary piezoelectric source that receives electricity generating compression strain from vehicles passing over said modules.

14. The system of claim 9 in which the outer surface of the mechanical energy recapture device is constructed of corrosion-resistant material selected from the group consisting of para-aramid synthetic fiber, kevlar fiber, and carbon fiber.

15. The system of claim 9 in which for each said submodule, the said primary piezoelectric sources are mounted in front of the said electromagnetic generators in the line of travel of vehicles where the said piezoelectric sources are activated by oncoming vehicles before activation of the said electromagnetic generators.

16. The system of claim 9 in which the said energy recapture devices are mounted by axial support and mechanically linked by a fluid-filled clutch to the said electromagnetic generators.

* * * * *